(12) United States Patent
Slobodin et al.

(10) Patent No.: US 6,988,806 B2
(45) Date of Patent: *Jan. 24, 2006

(54) INSTANT-ON PROJECTOR

(75) Inventors: David E. Slobodin, Lake Oswego, OR (US); Mark D. Peterson, Lake Oswego, OR (US); Kurt A. Stahl, Portland, OR (US)

(73) Assignee: InFocus Corporation, Wilsonville, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 10/732,178

(22) Filed: Dec. 9, 2003

(65) Prior Publication Data

US 2004/0174501 A1 Sep. 9, 2004

Related U.S. Application Data

(63) Continuation-in-part of application No. 09/877,955, filed on Jun. 8, 2001, now Pat. No. 6,688,747.

(51) Int. Cl.
*G03B 21/00* (2006.01)
*G03B 21/14* (2006.01)
*G03B 21/26* (2006.01)
*G02B 27/00* (2006.01)

(52) U.S. Cl. .............. 353/31; 353/20; 353/29; 353/94; 353/122; 359/577

(58) Field of Classification Search ............. 353/20, 353/29, 31, 69, 84, 94, 122; 362/228, 242, 362/268, 293; 359/577
See application file for complete search history.

(56) References Cited

U.S. PATENT DOCUMENTS

| | | | |
|---|---|---|---|
| 5,233,385 A | 8/1993 | Sampsell | 355/35 |
| 5,526,237 A | 6/1996 | Davenport | 362/32 |
| 5,706,061 A | 1/1998 | Marshall et al. | 348/743 |
| 6,224,216 B1 | 5/2001 | Parker et al. | 353/31 |
| 6,356,700 B1 | 3/2002 | Strobl | 385/147 |
| 6,398,389 B1 | 6/2002 | Bohler et al. | 362/293 |
| 6,407,785 B1 | 6/2002 | Yamazaki | 349/113 |
| 6,409,349 B1 | 6/2002 | O'Connor | 353/31 |
| 6,431,727 B1 | 8/2002 | Sugawara et al. | 362/244 |
| 6,495,844 B1 | 12/2002 | Brabham et al. | 250/504 |
| 6,688,747 B2 * | 2/2004 | Wichner et al. | 353/29 |
| 6,733,139 B2 * | 5/2004 | Childers et al. | 353/94 |

* cited by examiner

*Primary Examiner*—Judy Nguyen
*Assistant Examiner*—Melissa J Koval
(74) *Attorney, Agent, or Firm*—Schwabe, Williamson & Wyatt, P.C.

(57) ABSTRACT

A projection system is provided with a primary light source and an auxiliary light source to compensate the primary light source for at least white light during an initial period to provide a user with an instant-on experience. In various embodiments, the auxiliary light source further compensates the primary light source for energy deficiencies for the red spectrum to achieve more balance in color.

22 Claims, 8 Drawing Sheets

INSTANT-ON PROJECTOR

RELATED APPLICATION

The present application is a continuation-in-part application of U.S. Pat. No. 6,688,747, application Ser. No. 09/877,955, filed on Jun. 8, 2001 and issued on Feb. 10, 2004, entitled "Achieving Color Balance in Image Projection Systems by Injecting Compensating Light".

TECHNICAL FIELD

This invention relates to image projection systems and more particularly to a method for providing a user with an instant-on experience, and for improving the brightness and color balance of images produced by such projection systems.

BACKGROUND OF THE INVENTION

Image projection systems have been used for many years to project motion pictures and still photographs onto screens for viewing. More recently, presentations using multimedia projection systems have become popular for conducting sales demonstrations, business meetings, and classroom instruction.

Color image projection systems may operate on the principle that color images are produced from the three primary light colors: red ("R"), green ("G"), and blue ("B"). With reference to FIG. 1, a prior art image projection system 100 includes a primary light source 102 positioned at the focus of an ellipsoidal light reflector 104 to produce light rays 105 (not shown) of polychromatic light that propagate along a primary light path 106 through a rotating color wheel assembly 108. Color wheel assembly 108 includes at least three filter sections, each tinted in a different one of primary colors R, G, and B. Light rays 105 of polychromatic light emitted by primary light source 102 propagate along light path 106 through an optical integrating device, such as a light tunnel 110 of either a solid or hollow type, to create at its exit end a uniform illumination pattern. (A light tunnel 110 of a solid type is shown in FIG. 1.) Light tunnel 110 works on the principle of multiple reflection to achieve uniform light intensity over a rectangular area with the same dimensional proportions as the final projected image. The illumination pattern is imaged by a lens element system 112, reflected off a light reflecting surface 114, and transmitted through a projection lens 116 to form an image. Popular commercially available image projection systems of a type described above include the LP300 series manufactured by InFocus Corporation, of Wilsonville, Oreg., the assignee of this application.

There has been significant effort devoted to developing image projection systems that produce bright, high-quality color images. However, the optical performance of conventional projectors is often less than satisfactory. For example, suitable projected image brightness is difficult to achieve, especially when using compact portable color projectors in a well-lighted room.

To improve the brightness of images they project, image projection systems typically employ a high-intensity discharge ("HID") arc lamp as primary light source 102. FIG. 2 shows an exemplary HID arc lamp 120 that includes first and second electrodes 122 and 124 separated by an arc gap 126, which is preferably between 0.8 and 2.0 mm wide. First and second electrodes 122 and 124 and arc gap 126 are contained within a sealed pressurized chamber 128 that is filled with ionizable gases and solids. A high voltage pulse applied to first electrode 122 by an external voltage source (not shown) causes ionization of the gases and solids contained within chamber 128 such that a steady state reversible reaction occurs, resulting in the formation of plasma. The current flow developed across arc gap 126 is maintained by external lamp driving electronic circuitry, thereby maintaining the plasma generated by the steady state reversible reaction. The plasma emits bright polychromatic light. The components of arc lamp 120 are enshrouded in a glass envelope 130, and conductive foil plates 132 are attached to electrodes 122 and 124 to dissipate heat and thereby prevent cracking of glass envelope 130.

Thus HID arc lamps produce a point source of intense polychromatic light. Placing the HID arc lamp adjacent to an ellipsoidal reflector allows focusing of the intense polychromatic light with high precision onto a color wheel. HID arc lamps have many favorable attributes, such as high intensity, efficiency, and reliability; but, unfortunately, HID arc lamps typically take some time to warm up, after power on, before achieving their full brightness. During this initial (post power on) period, the brightness of the projected images gradually increases. Resultantly, users of projection systems having such HID arc lamps often feel the projection systems are not fully operational during this warm up period.

Further, the polychromatic light emitted by HID arc lamps is not balanced in terms of its emission energy content. Specifically, HID arc lamps provide greater emission energy content at the blue end of the color spectrum than at the red end, causing an emission energy imbalance. There have been several attempted approaches to solving this problem.

One attempt to minimize illumination emission energy imbalance entailed increasing the angular extent (physical size) of the color wheel R filter segment relative to the angular extent of the B filter segment and/or increasing the attenuation of the color wheel B filter segment relative to the attenuation of the R filter segment. A second attempt entailed reducing overall brightness levels through color lookup electronics to achieve "headroom" for color adjustments. Unfortunately, these attempts either caused temporal artifacts or decreased image brightness. A third attempt entailed adding a white filter segment to the color wheel to provide a "white peaking" function. The addition of a white filter segment increased image brightness but resulted in a loss of brightness of saturated colors. Unfortunately, these optical components caused a significant amount of light to escape from the primary colors. A fourth attempt entailed simply employing a more powerful arc lamp in the projection system. When implemented in compact portable projectors, this method led to heat, size, weight, cost, and reliability issues.

What is needed, therefore, is an image projection system that is implemented with an improved technique for providing a user with an instant-on experience, and/or for achieving increased image brightness and adjustable color balance while reducing light loss during operation.

BRIEF DESCRIPTION OF THE DRAWINGS

Embodiments of the present invention will be described by way of the accompanying drawings in which like references denote similar elements, and in which:

FIG. 13b is an enlarged view of the illumination subsystem of FIG. 13a.

DETAILED DESCRIPTION OF EMBODIMENTS OF THE INVENTION

Embodiments of the present invention include but are not limited to methods for giving a user an instant-on experience, and achieving increased image brightness and adjustable color balance while reducing light loss, during subsequent operation, and projection systems incorporated with logics to practice the methods.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
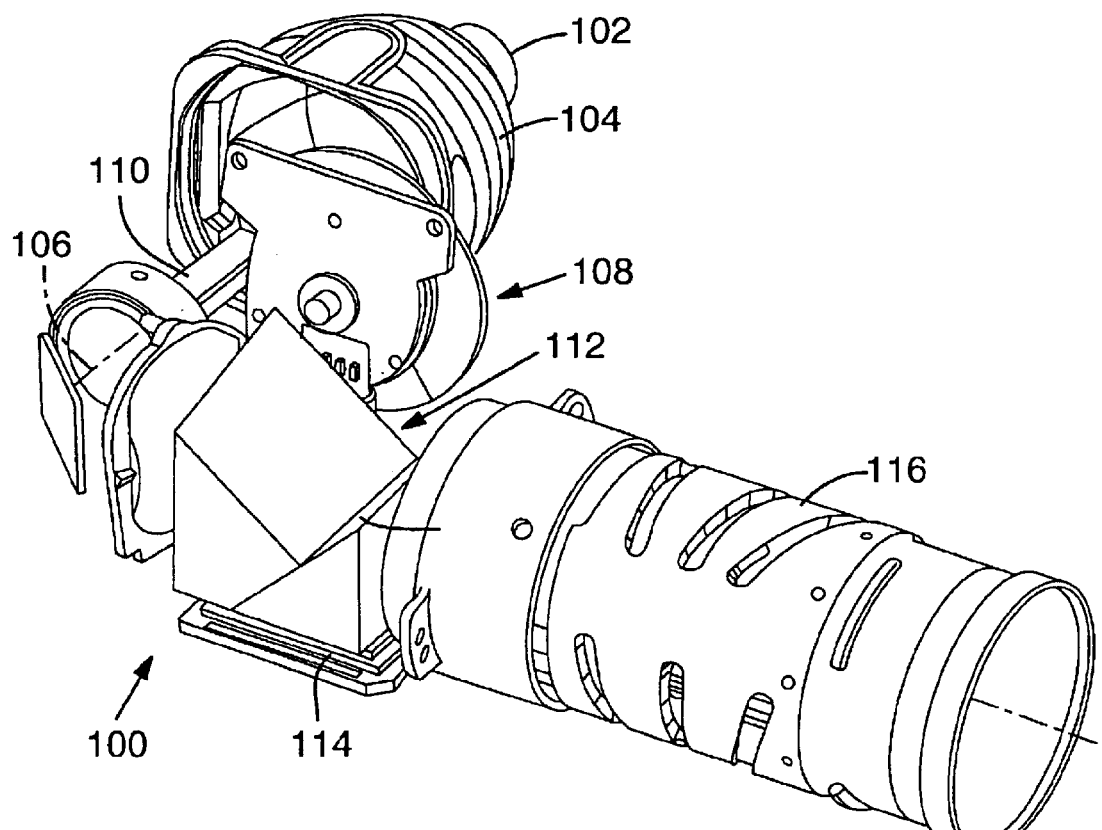
FIG. 1 is an isometric pictorial view of a prior art color image projection system.
Figure 2:
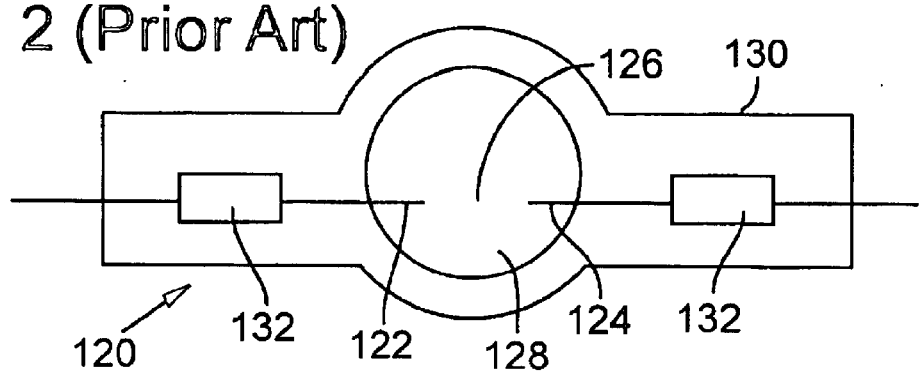
FIG. 2 is an enlarged, diagrammatic side elevation view of a prior art HID arc lamp.

Different embodiments of the present invention, described by way of example, position an auxiliary light source at different locations in image projection system 100 of FIG. 1 to provide for an instant-on experience, and/or to compensate for the emission energy imbalance in the emission spectrum of primary light source 102. Skilled persons will readily appreciate that the present invention can be implemented in other types of image projection systems, such as a three-path projection system.

Figure 3A:
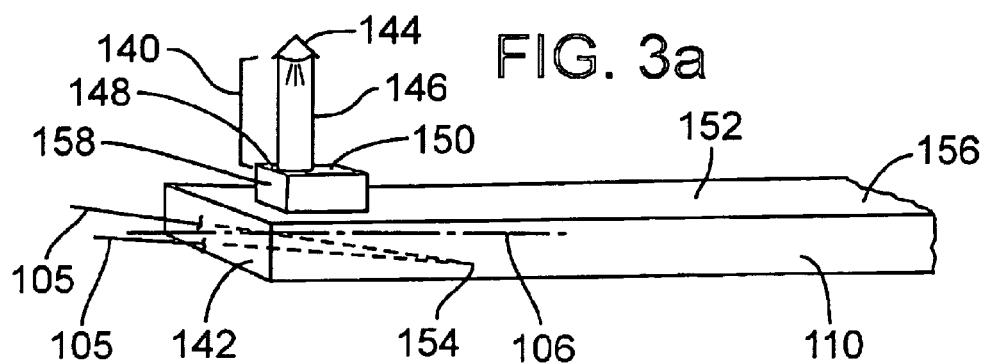
FIG. 3a is a fragmentary oblique view of a first embodiment of an illumination subsystem added to the prior art image projection system of FIG. 1 in which an auxiliary light source is affixed at a location near the entrance end of a solid light tunnel before the location of the first paraxial reflection.

FIG. 3a shows a schematic view of a first embodiment of the present invention, in which an auxiliary light source 140 is affixed at a location near an entrance end 142 of an optical integrating device, preferably light tunnel 110. Auxiliary light source 140 preferably includes one or more solid state light-emitting devices 144, such as a light-emitting diode (LED), from which compensating light propagates through an optical fiber 146 into an optical coupling device, preferably a prism 148. Prism 148 directs the compensating light into light tunnel 110 at an appropriate angle to cause the compensating light to coincide with light rays 105 of polychromatic light propagating along primary light path 106.

In the embodiment depicted in FIG. 3a, optical fiber 146 is affixed to prism 148 on an input prism face 150 that is substantially parallel to a first light tunnel surface 152 to which prism 148 is affixed. Prism 148 is affixed at a location near entrance end 142 of light tunnel 110 upstream of a location 154 where the first paraxial reflection occurs. Providing optical contact between prism 148 and first light tunnel surface 152 before location 154 of the first paraxial reflection reduces loss of the polychromatic light from light path 106 into prism 148.

Light tunnel 110, shown in FIG. 3a, is one exemplary optical integrating device; alternative optical integrating devices are discussed in detail later with reference to certain implementations of this first embodiment. Light tunnels are commonly implemented in image projection systems to create a uniform illumination pattern with the same dimensional proportions as the final desired image. Light tunnels operate on the principle of multiple reflection, wherein transmitted light reflects off all sides of the light tunnel such that light of substantially uniform intensity is emitted from the output end of the light tunnel. Light tunnel 110 is preferably of rectangular shape so that the uniform illumination pattern of light propagating from an exit end 156 of light tunnel 110 of rectangular shape. Light tunnel 110 is also preferably composed of a solid glass rod. Light tunnel 110 is preferably wider than prism 148 so that the total surface area of light tunnel 110 that supports prism 148 is reduced and thus the amount of loss of polychromatic light from primary light path 106 is reduced. An exemplary solid light tunnel is 4.5 mm×6.0 mm×40 mm long.

Each light-emitting device 144 can be any light source including an LED, a laser, and an arc lamp. In various embodiments, an LED is employed because it emits virtually monochromatic light and is compact and inexpensive. In one embodiment, at least one white LED and a red LED is provided. The white LED is employed during an initial period to provide white light to complement the less than full brightness light outputted by arc lamp 120 while it is warming up, providing a user with the desired instant-on experience. As described earlier, the light outputted by arc lamp 120 is less than full brightness during the initial warm up period, after power on. The white LED, by virtue of its solid state constitution, is generally able to warm up and output light in substantially full brightness in a substantially shorter period than the time period required by arc lamp 120 to warm up. The red LED is employed during a subsequent operational period to provide red light to compensate the red spectrum of the light outputted by arc lamp 120. An LED that emits light with an emission spectrum corresponding to red light typically emit approximately 30 lumens of red light. This additional red light generally effects a 10 percent increase in red light emission energy content in primary light path 106. The introduction of red light allows for use of a color wheel with a smaller red segment and larger green and white segments to increase overall light transmission.

In alternate embodiments, the invention may be practiced with only white light compensation during the initial period, or only red light compensation during the subsequent operation period, but not both.

Figure 4A:
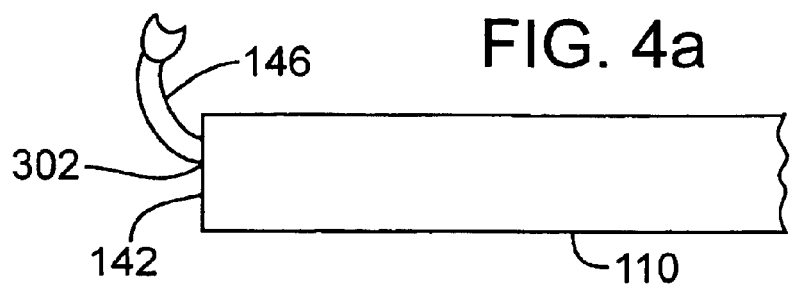
FIGS. 4a and 4b are fragmentary side elevation views of different implementations of the first embodiment of the illumination subsystem implemented with alternative optical fibers.

Optical fiber 146 can be made of any suitable material, but is preferably plastic or glass. Optical fiber 146 can be any size that is appropriate to the image projection system, but preferably has a diameter of approximately 1 mm because such an optical fiber is inexpensive and more robust than an optical fiber with a smaller diameter. Optical fiber 146 may be of any suitable shape that is appropriate to the image projection system. Optical fiber 146 depicted in FIG. 3a is a straight fiber. Alternatively, optical fiber 146 may be curved, as shown in FIG. 4a.

Optical fiber 146 may be directly coupled to light tunnel 110. Such coupling may be implemented in any suitable, conventional way, in particular, one of the following two arrangements may be employed. In the instance of a hollow light tunnel, an exit end 302 of optical fiber 146 abuts entrance end 142 of light tunnel 110, as is shown in FIG. 4a.

Figure 4B:
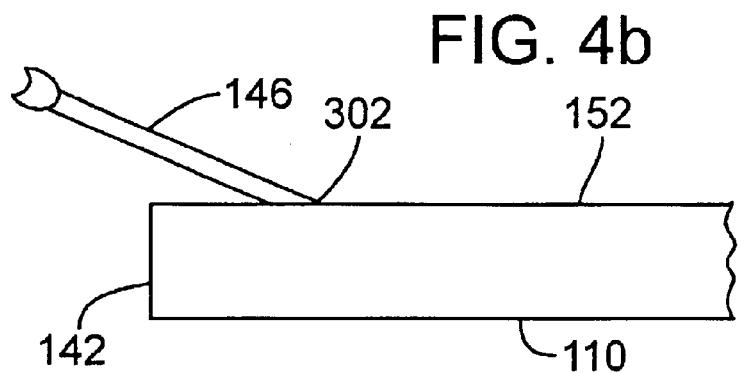

In this alternative, optical fiber 146 is preferably attached to a corner of entrance end 142 of light tunnel 110 so that loss of polychromatic light emitted by primary light source 102 and reflected or refracted off optical fiber 146 is reduced. In a second alternative arrangement, exit end 302 of optical fiber 146 abuts a first light tunnel surface 152, as shown in FIG. 4b. Both methods allow compensating light propagating from solid state light-emitting device(s) 144 to exit optical fiber 146 and coincide with polychromatic light emitted by primary light source 102.

The benefits of the illumination subsystem of the present invention can also be achieved without the incorporation of optical fiber 146 into auxiliary light source 140. In an illumination subsystem configured without optical fiber 146, compensating light propagating from solid state light-emitting device(s) 144 directly enters prism 148.

Figure 5:
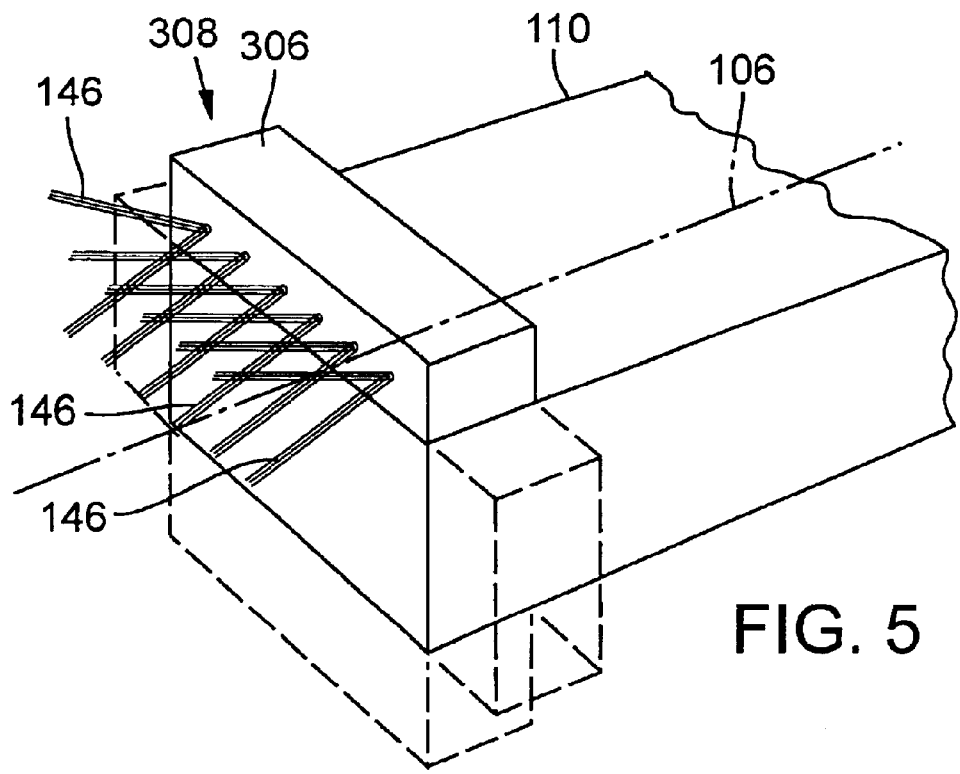
FIG. 5 is a fragmentary isometric view of the first embodiment of the illumination subsystem of FIG. 3a implemented with a fiber optic bundle attached to an optical integrating device.

Alternatively, the benefits of the illumination subsystem of the present invention can be achieved by providing multiple optical fibers 146 in a fiber bundle to direct compensating light emitted by the solid state light-emitting device(s) 144 into an optical integrating device. FIG. 5 shows multiple separate fiber bundles, each formed with multiple fibers. The ends of multiple optical fibers 146 may be embedded in an optical integrating device 306 that is made of an optical material with an index of refraction that corresponds to the index of refraction of the material used to form light tunnel 110. Optical fibers 146 are embedded at an angle with respect to light path 106 such that the compensating light they emit coincides with polychromatic light from primary light source 102 within light tunnel 110. Optical assembly 308, including optical fibers 146 and optical integrating device 306, may be affixed to any side of light tunnel 110 (alternative attachments shown in phantom lines). One advantage to use of this alternative implementation is that optical assembly 308, optical fibers 146, and optical integrating device 306, can be separately constructed and installed with an optical adhesive, resulting in reduced manufacturing costs. Alternatively, multiple optical assemblies 308 may be attached to light tunnel 110.

Figure 3B:
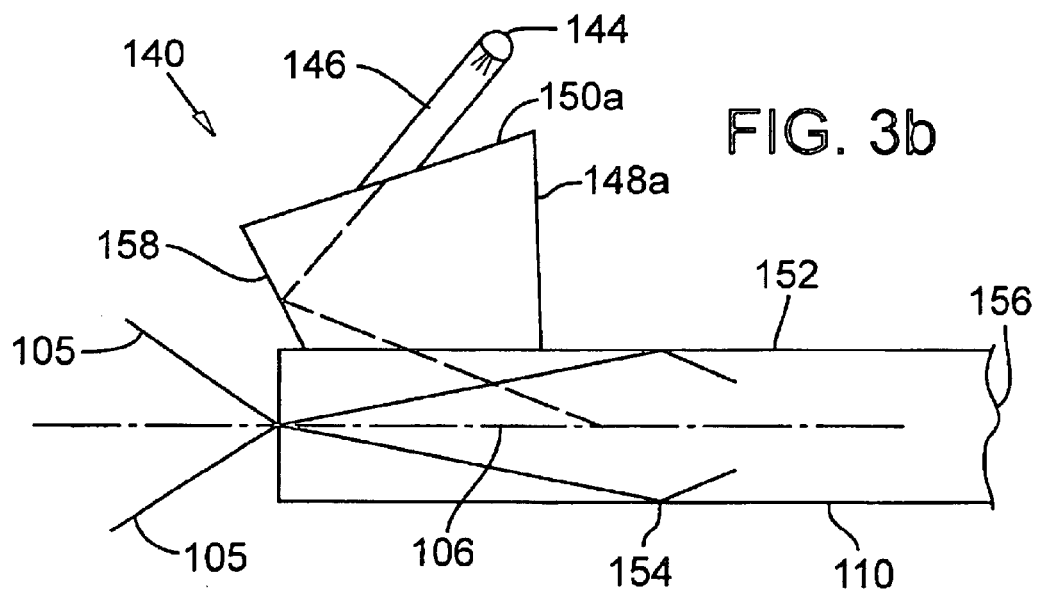
FIG. 3b is an enlarged fragmentary side elevation view of the first embodiment of the illumination subsystem of FIG. 3a implemented with an alternative prism.

Compensating light emitted by solid state light-emitting device 144 and transmitted through optical fiber 146 can be coupled into light tunnel 110 by an optical coupling device. Exemplary optical coupling devices include prisms, glass rods, and mirrors. In various embodiments, prism 148 is employed. Prism 148 is preferably attached to optical fiber 146 using an optically transparent adhesive, e.g., a UV-cured adhesive. The attachment of prism 148 to optical fiber 146 is such that the compensating light directed through optical fiber 146 reflects off prism reflection surface 158 with an angle of incidence that allows the compensating light to coincide with the light rays 105 of polychromatic light that propagate along primary light path 106. For example, FIG. 3b shows one exemplary illumination subsystem in which compensating light exiting optical fiber 146 has an approximately 45 degree angle of incidence with respect to a prism reflection surface 158 of a prism 148a to allow the compensating light to coincide with light path 106 before the location of first paraxial reflection 154. As shown in FIG. 3b, prism 148a has an input prism face 150a that is angularly inclined relative to light tunnel surface 152 to illustrate an alternative propagation path of light emitted by solid state light-emitting device 144. Prism 148 need not have an inclined prism face, this implementation is merely exemplary.

Prism 148 may be of any size or shape suitable for the image projection system. For example, input prism face 150 depicted in FIG. 3a is substantially parallel to first light tunnel surface 152 on which prism 148 is mounted, whereas the input prism face 150a depicted in FIG. 3b is not parallel to first light tunnel surface 152.

The benefits of the illumination subsystem of the present invention can be achieved without the incorporation of an optical coupling device into auxiliary light source 140. In an illumination subsystem configured without an optical coupling device, compensating light is injected directly into light tunnel 110 via optical fiber 146 or solid state light-emitting device 144.

Figure 6:
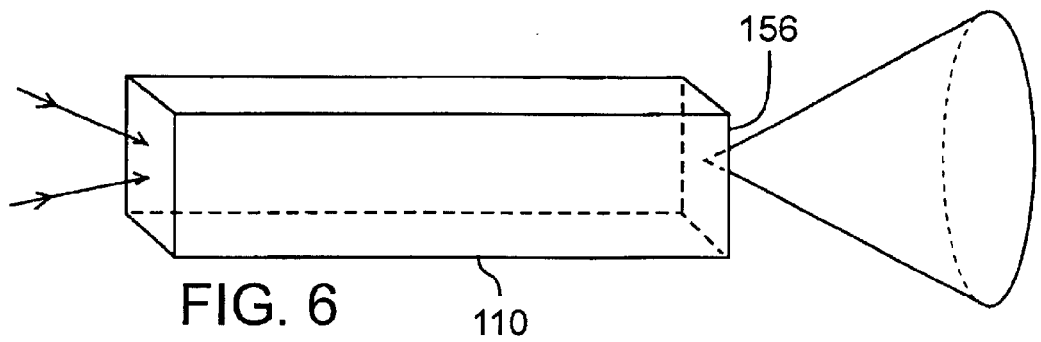
FIGS. 6 and 7 show for all azimuthal angles on-axis a cone representing the distribution of the intensity of light exiting the light tunnel of, respectively, the prior art image projection system of FIG. 1 and of the image projection system of either of FIG. 3a or FIG. 3b.
Figure 7:
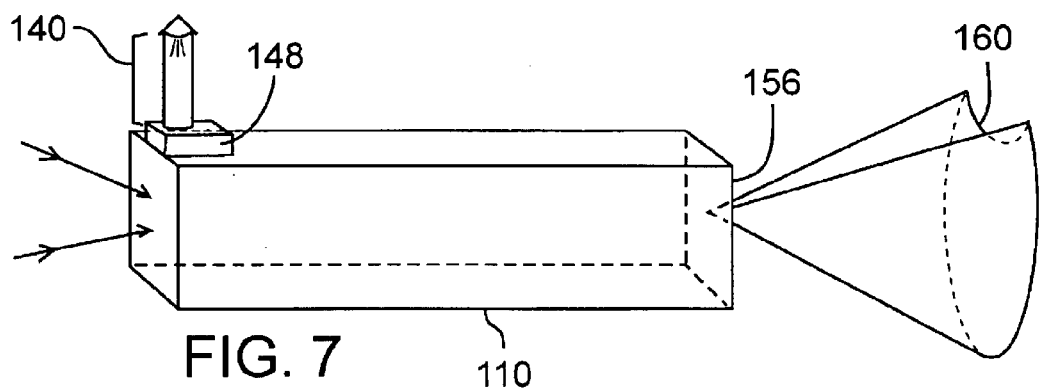

Providing optical contact between prism 148 and first light tunnel surface 152 before location 154 of the first reflection reduces loss of the polychromatic light entering light tunnel 110 through entrance end 142 because little polychromatic light is incident on the side surfaces of light tunnel 110 close to entrance end 142. This reduced amount of light loss is demonstrated by a comparative relationship of light intensity distributions depicted in FIGS. 6 and 7. FIG. 6 is a schematic diagram showing a cone of light exiting light tunnel 110 of the prior art image projection system 100 of FIG. 1. The cone of light may approximate for all on-axis azimuthal angles, i.e., the angular light intensity distribution of polychromatic light emitted by primary light source following transmission through light tunnel 110 and upon exit from light tunnel 110 at exit end 156. In comparison, FIG. 7 is a schematic diagram showing a cone of light exiting light tunnel 110 of the image projection system of either of FIG. 3a or FIG. 3b, in which auxiliary light source 140 introduces compensating light into the image projection system. The cone of light depicted in FIG. 7 approximates the angular light intensity distribution of polychromatic light emitted by primary light source 102 following transmission through light tunnel 110 and upon exit from light tunnel 110 at exit end 156. A notch 160 at the top of the cone of light shown in FIG. 7 represents an approximately 3 percent loss of polychromatic light due to the affixing of optical coupling prism 148. Such reduced amount of light loss is in light of the total gain in emission energy content corresponding to red light resulting from the incorporation of auxiliary light source 140 into the image projection system of the present invention.

Auxiliary light source 140 of the first embodiment of the present invention, may be affixed to the optical integrating device at any location near entrance end 142. Affixing auxiliary light source 140 at a location near entrance end 142 of the optical integrating device causes a reduced amount of light loss because a reduced amount of light is incident on the integrating device near its entrance end. While affixation of auxiliary light source 140 is preferably effected at any location near entrance end 142, affixation at certain locations offers various benefits, which are discussed below.

Figure 8:
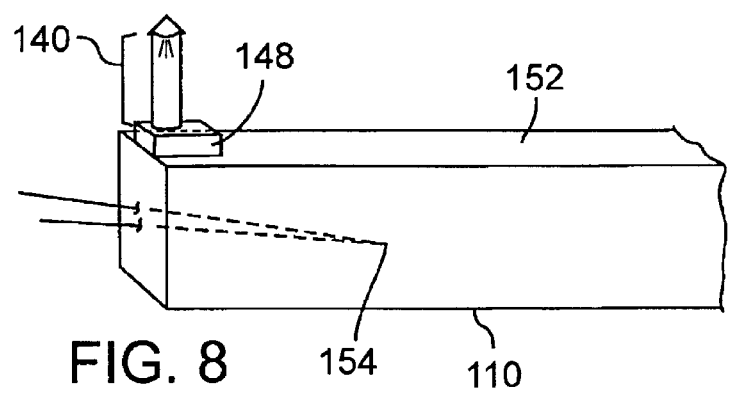
FIG. 8 is a fragmentary oblique view of a first alternative implementation of the first illumination subsystem embodiment in which the auxiliary light source is offset to a corner of a solid light tunnel.

FIG. 8 depicts a first alternative implementation of the first embodiment of the present invention in which auxiliary light source 140 is affixed to first light tunnel surface 152 and is offset to a corner of light tunnel 110. This first alternative implementation is especially beneficial because it reduces the loss of polychromatic light propagating through the point of affixation of auxiliary light source 140.

Figure 9:
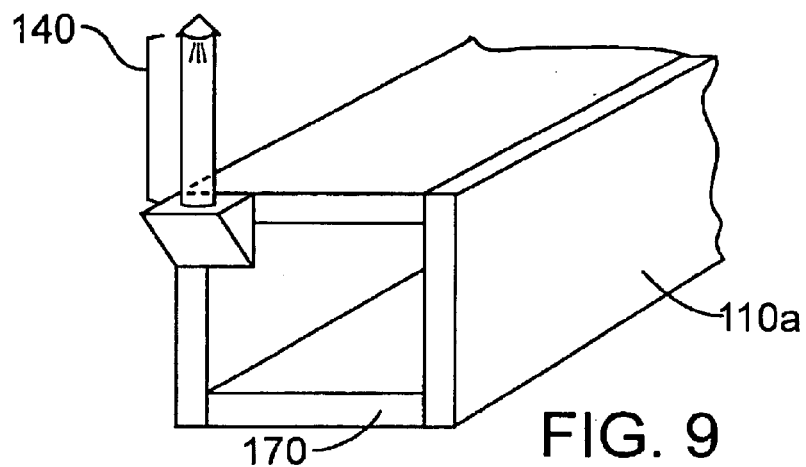
FIG. 9 is a fragmentary oblique view of a second alternative implementation of the first illumination subsystem embodiment in which the auxiliary light source is affixed to an entrance end of a hollow light tunnel.

FIG. 9 depicts a second alternative implementation of the first embodiment of the present invention in which auxiliary light source 140 is affixed to a surface of an entrance end 170 of a hollow light tunnel 110a. While this alternative implementation may introduce additional thickness to entrance end 170 of light tunnel 110a and thereby impact the spacing of color wheel assembly 108, this implementation allows for the use of a hollow light tunnel instead of a solid light tunnel of the type shown in FIGS. 3a, 3b, and 8. Hollow light tunnels are less expensive and shorter in length as compared to a solid light tunnel that achieves an equivalent illumination uniformity at the tunnel output end.

Figure 10A:
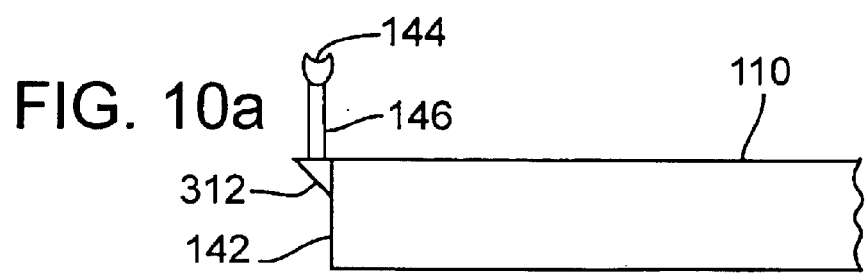
FIGS. 10a, 10b, and 10c are fragmentary side elevation views of the illumination subsystem of FIG. 9 implemented with alternative optical integrating devices.
Figure 10B:
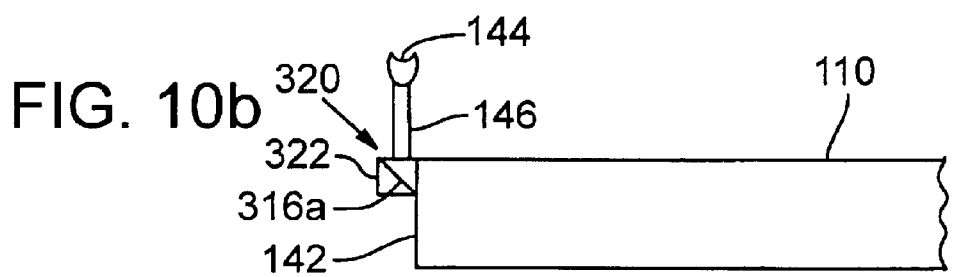
Figure 10C:
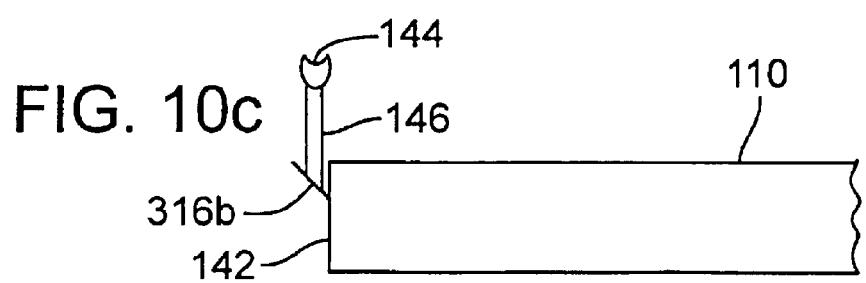

FIGS. 10a, 10b, and 10c depict three alternative optical integrating devices that can be used in the image projection system shown in FIG. 9. FIG. 10a shows use of an injection prism 312 that has a reflectance surface at a 45 degree angle relative to entrance end 142 of light tunnel 110. Injection prism 312 can be used with a hollow light tunnel of the type shown in FIG. 9 or with a solid light tunnel of the type shown in FIG. 8. FIG. 10b shows use of a beam splitter prism 320 in the image projection system of FIG. 9. Beam splitter prism 320 includes a dichroic mirror 316a with a compensating prism 322 situated at a 45 degree angle to entrance end 142 of light tunnel 110, thereby forming a beam splitter cube that allows light from primary light source 102 to pass through the beam splitter cube without getting lost. FIG. 10c shows use of a dichroic mirror 316b inclined at an acute angle to entrance end 142 of light tunnel 110 of the image projection system of FIG. 9.

The image projection system of the present invention may also include multiple auxiliary light sources. The use of multiple auxiliary light sources allows the user to implement lower output, and therefore less expensive, solid state light emitting devices while effecting an instant-on experience and/or a reduction in emission energy imbalance similar to that effected by using a single high output solid state light source. Alternatively, the use of multiple auxiliary light sources allows the user to effect an increased reduction in emission energy imbalance by introduction of an increased amount of compensating light whose emission energy content reduces an emission energy imbalance. The multiple auxiliary light sources may be affixed to any side of light tunnel 110 or 110a but are preferably affixed at a location near entrance end 142 or 170, before the location of first paraxial reflection 154.

Figure 11A:
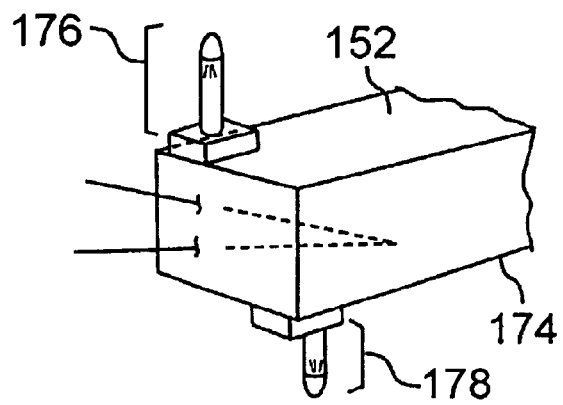
FIGS. 11a and 11b are fragmentary oblique views depicting two configurations of a third alternative implementation of the first illumination subsystem embodiment in which multiple auxiliary light sources are affixed to, respectively, corresponding or opposite corners of opposed surfaces of the solid light tunnel.
Figure 11B:
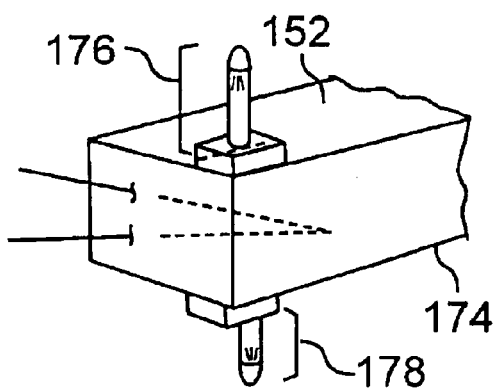

FIGS. 11a and 11b depict two implementations of a third alternative implementation of the first embodiment of the present invention in which one of multiple auxiliary light sources is affixed to first light tunnel surface 152 and one of multiple auxiliary light sources is affixed to a second light tunnel surface 174 that is opposite first light tunnel surface 152. FIG. 11a shows a configuration in which a first auxiliary light source 176 is affixed to first light tunnel surface 152 and a second auxiliary light source 178 is affixed to second light tunnel surface 174 such that first and second auxiliary light sources 176 and 178, respectively, are located on opposite corners of light tunnel 110. FIG. 11b shows an alternative configuration in which first and second auxiliary light sources 176 and 178, respectively, are located on corresponding corners of light tunnel 110. For this embodiment, one of the auxiliary light sources 176/178 may provide the white light, while the other provides the red light. Alternatively, both may first provide the white light, and subsequently provide the red light.

Figure 12:
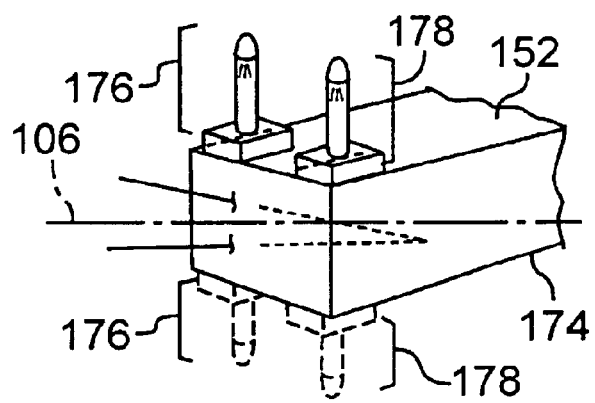
FIG. 12 is a fragmentary oblique view of a fourth alternative implementation of the first illumination subsystem embodiment in which multiple light sources are affixed to the same surface of the solid light tunnel.

FIG. 12 depicts a fourth alternative implementation of the first embodiment of the present invention in which the multiple auxiliary light sources 176 and 178 are affixed to either of first light tunnel surface 152 (solid lines) or second light tunnel surface 174 (phantom lines).

Skilled persons will appreciate, therefore, that a prism may be placed on the entrance surface, any side surface, or top or bottom surfaces of a solid or hollow light tunnel.

Figure 13A:
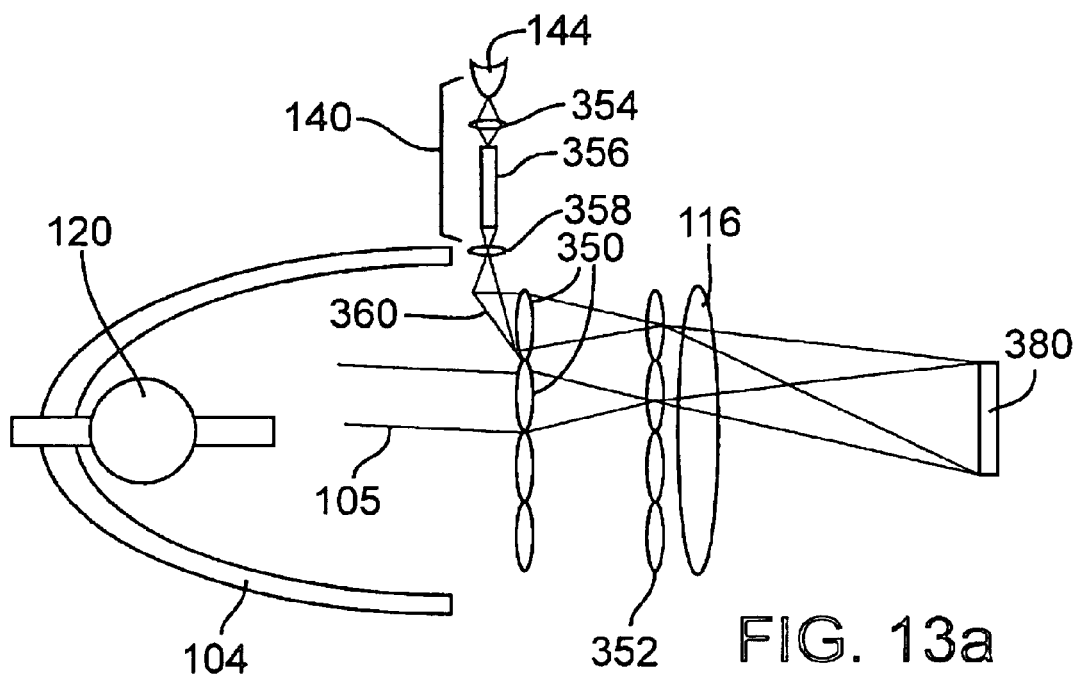
FIG. 13a is an enlarged, diagrammatic side elevation view of a fifth alternative implementation of the first illumination subsystem embodiment in which a pair of flyseye lenslets are implemented as the optical integrating device.
Figure 13B:
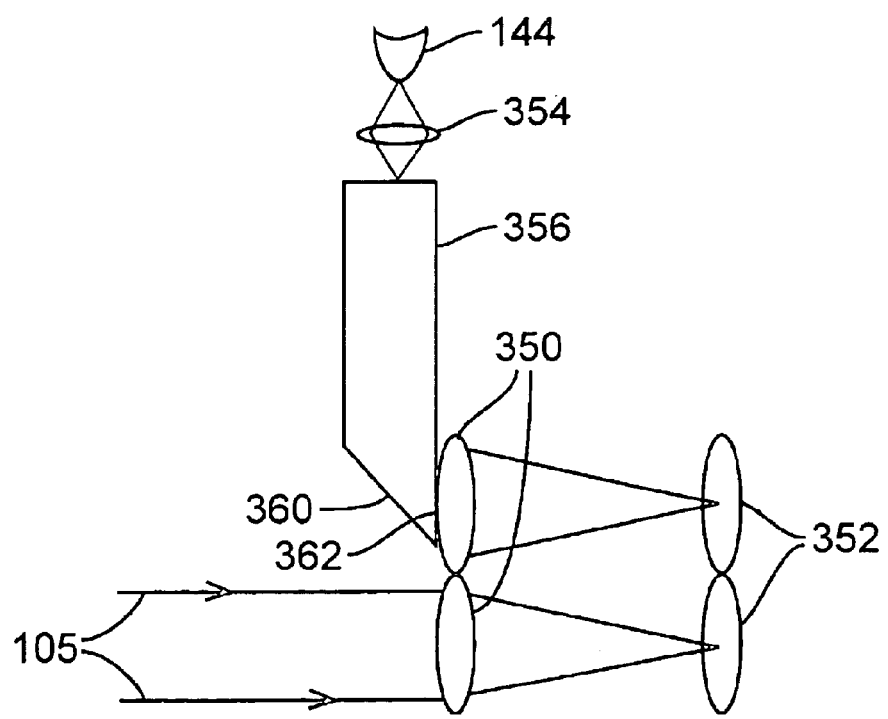

FIGS. 13a and 13b show a fifth alternative implementation of the present invention in which a second exemplary optical integrating device is implemented. This optical integrating device is a pair of flyseye integrator plates each containing an array of lenslets designed to create multiple overlapping images so that any nonuniformity in one lenslet is integrated out at a display device 380.

FIG. 13a shows an embodiment of the present invention in which light emitted by an HID arc lamp 120 strikes (or is incident on) a first set of flyseye lenslets 350. Each first lenslet 350 has the same aspect ratio as display device 380. Light exits first flyseye lenslets 350 and enters a second set of flyseye lenslets 352, each of which is spatially aligned with corresponding first flyseye lenslets 350. Second flyseye lenslets 352 image the apertures of first flyseye lenslets 350 onto display device 380. A condensing lens 116 overlaps the multiple images at lenslets 350 created by corresponding lenslets 352 onto display device 380. First and second flyseye lenslets, 350 and 352 respectively, may be any size and shape appropriate to the image projection system, but are preferably 4×6 mm rectangular.

As shown in FIG. 13a, auxiliary light source 140 is affixed at a location near first flyseye lenslet 350. Compensating light emitted by solid state light-emitting device 144 preferably passes through a light collection lens 354, an integrator tunnel 356, and an integrator imaging lens 358 before encountering mirror 360. Mirror 360 may be of metallic or multilayer dielectric type. If mirror 360 is a multilayer dielectric type, it can be designed to reflect the compensating light while still transmitting much of the polychromatic light from the primary light source. Compensating light exiting integrator imaging lens 358 reflects off mirror 360 through one of first flyseye lenslets 350 and through one of second flyseye lenslets 352, which reflection causes rays of compensating light to coincide with light rays 105 of polychromatic light. This alternative implementation results in first flyseye lenslet 350 being uniformly filled with compensating light such that the resulting image projected by the projection device contains excellent color uniformity.

Implementation of the flyseye integrator plates may also involve an auxiliary light source without an integrator tunnel 356. Thus compensating light emitted by solid state light-emitting device 144 passes through light collection lens 354 and integrator imaging lens 358 before being reflected by mirror 360 through the flyseye optical integrating device. One of first flyseye lenslets 350 is filled with compensating light exiting the auxiliary light source; thus no polychromatic light exiting primary light source 102 enters first flyseye lenslet 350. One advantage of this alternative implementation is that the auxiliary light device can be easily coupled to the remainder of the image projection system.

As shown in FIG. 13b, the auxiliary light source may lack an integrator imaging lens 358. In such a image projection system, compensating light emitted by solid state light-emitting device 144 passes through light collection lens 354 and integrator tunnel 356 before being reflected off mirror 360, located near exit end 362 of integrator tunnel 356. The compensating light reflects off a 45-degree angled exit end 362 of integrator tunnel 356 by total internal reflection or a mirror coating and is directed through first flyseye lenslet 350.

In a second embodiment, the auxiliary light source is coupled to a light reflector adjacent to the primary light source and thereby allows the compensating light to propagate through the image projection system with the same efficiency as that of the light generated by the primary light source.

Figure 14:
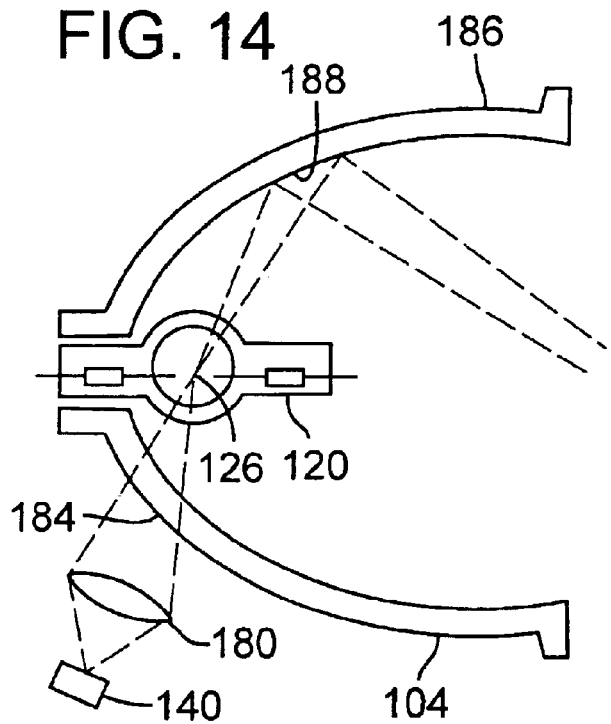
FIG. 14 is a diagram of a second embodiment of an illumination subsystem in which an auxiliary light source is positioned adjacent to a light reflector and emits compensating light that is coupled with a primary light source.

FIG. 14 shows a schematic diagram of a second embodiment of the present invention in which auxiliary light source 140 is positioned adjacent to an outer surface 186 of light reflector 104 and is coupled to primary light source 102, which is preferably an HID arc lamp 120. Auxiliary light source 140 emits a compensating light beam that is focused by an optical focusing element 180, and propagates through a compensating light entrance zone 184 on light reflector 104 to pass through arc gap 126 of arc lamp 120 and strike an inner surface 188 of light reflector 104.

To enable propagation of the compensating light beam through light reflector 104, inner surface 188 of light reflector 104 at compensating light entrance zone 184 carries no coating, a low reflection coating, or preferably a wavelength selective transmission coating, the last of which transmits light of wavelengths equal to the compensating light wavelength while reflecting visible light of wavelengths not equal to the compensating light wavelength. This compensating light entrance zone coating is generally a different coating material from that applied to the remainder of inner surface 188 of light reflector 104. Inner surface 188 typically carries a metallic or dielectric coating to achieve increased reflectance over the operating range of wavelengths of image projection system 100. Light reflector 104 is preferably coated with a spectrally selective transmission coating, which transmits compensating light through the image projection system with the same efficiency as polychromatic light generated by HID arc lamp 120 and reflects light transmitted by other light sources. Polychromatic light emitted by HID arc lamp 120 may be lost through compensating light entrance zone 184 of light reflector 104. The wavelength selective transmission coating reduces the loss of polychromatic light emitted by HID arc lamp 120 which light would otherwise pass through an uncoated compensating light entrance zone 184.

Light reflector 104 is preferably made of a material such as glass that transmits light so that the compensating light beam can pass through the light reflector wall on its way to arc gap 126. Depending on the design goals and the details of downstream optical parts for the image projection system, light reflector 104 may have an ellipsoidal, a paraboloidal, a general aspheric, or a faceted form. Because it provides illumination beam collection and focusing, light reflector 104 preferably includes a cold mirror. Since outer surface 186 of light reflector 104 is effectively an additional lens surface that refracts the incoming compensating light, outer surface 186 preferably is smooth and well controlled. Other specifications such as size, length, focal length, and thermal characteristics are determined by the design goals of the image projection system.

As stated above with respect to the first embodiment of the present invention, the solid state light emitting device contained within auxiliary light source 140 can be any solid state light source including an LED, a laser, or an arc lamp. LEDs may be particularly advantageous because they emit virtually monochromatic light and are compact and inexpensive. In various embodiments, the LEDS include at least one white LED and one red LED (although in alternate embodiments, only one aspect of the invention may be practice with LEDs of only one of the two colors included instead). LEDs that emit light with an emission spectrum corresponding to red light typically emit approximately 30 lumens of red light. This additional amount of red light generally effects a 10 percent increase in red light emission energy content in the primary light path.

Compensating light can alternatively be delivered using fiber optics to transfer the compensating light from auxiliary light source 140 to optical focusing element 180, which collects and focuses the compensating light propagating through compensating light entrance zone 184 of light reflector 104 and into arc gap 126.

Figure 15:
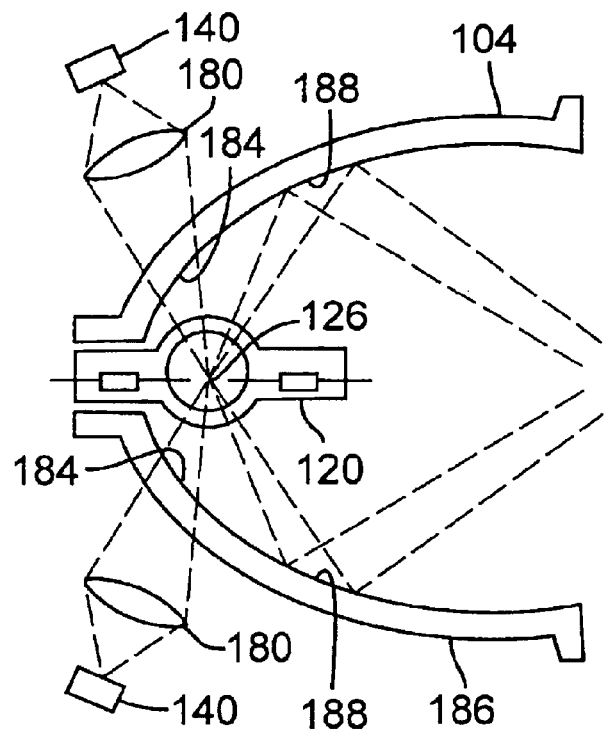
FIG. 15 is a diagram of an alternative implementation of the second embodiment of the illumination subsystem of FIG. 14 in which multiple auxiliary light sources are used.

FIG. 15 depicts an alternative implementation of the second embodiment of the illumination subsystem of the present invention in which multiple auxiliary light sources 140 (two shown) are placed around the perimeter of light reflector 104 to facilitate provision of an instant-on experience and/or more uniformly distribute compensating light within the illumination beam striking color wheel assembly 108 (not shown) and thus increase the uniformity with which the compensating light is distributed in the final projected image. Each auxiliary light source 140 is focused through arc gap 126 and is aligned so that each compensating light beam, having propagated through arc gap 126, does not impinge upon any other compensating light beam entering through compensating light entrance zone 184. The quantity, beam size, location, and orientation of the auxiliary light sources 140 are determined by the specific performance goals of the image projection system.

Thus, it can be seen from the above description, methods for providing an instant-on experience, and/or compensating for red spectrum during operation, and projection systems so equipped have been described. While the present invention has been described in terms of the foregoing embodiments, those skilled in the art will recognize that the invention is not limited to the embodiments described. For example, in yet other embodiments, the compensating light source(s) may be placed in the "shadow" or "hole" area of the arc lamp. Other embodiments may be practiced with modification and alteration within the spirit and scope of the appended claims. Accordingly, the description is to be regarded as illustrative instead of restrictive.

What is claimed is:

1. An image projection system comprising:
   a primary light source to propagate a polychromatic light along a primary light path;
   an auxiliary light source to propagate a compensating light to compensate the polychromatic light for at least brightness during an initial period;
   an optical integrating device, disposed along the primary light path and having a light tunnel within which light propagating through the light tunnel undergoes multiple occurrences of reflection so that light exiting the light tunnel is of substantially uniform light intensity, the optical integrating device being optically coupled to the primary and auxiliary light sources in a manner to receive the polychromatic and compensating lights separately, but coinciding upstream of or substantially at a location where the first reflection of light occurs; and
   an imaging arrangement optically coupled to the optical integrating device to project an image using the exiting light.

2. The system of claim 1, in which the auxiliary light source contains a light emitting device selected from a group including a light emitting diode, a laser, and an arc lamp.

3. The system of claim 1, in which the auxiliary light source includes an optical fiber through which the compensating light propagates, the optical fiber being optically coupled to one of a first side surface, a second side surface, and an entrance end of the light tunnel at the location upstream of or substantially at the first reflection of light.

4. The system of claim 3, in which the optical fiber has an exit end, and further comprising a reflective surface positioned between the exit end of the optical fiber and the light tunnel, the reflective surface optically coupling the compensating light propagating through the optical fiber to the light tunnel in a direction and at an angle to coincide with the primary light path at the location of the light tunnel upstream of or substantially at the location of the first reflection of light.

5. The system of claim 3, in which the optical fiber has an exit end, and further comprising one of a molded optical material or element positioned between the exit end of the optical fiber and the light tunnel, the one of a molded optical material or element optically coupling the compensating light propagating through the optical fiber to the light tunnel in a direction and at an angle to coincide with the primary light path at the location of the light tunnel upstream of or substantially at the location of the first reflection of light.

6. The system of claim 1, in which the primary light source comprises an arc lamp, the polychromatic light having an emission spectrum composed of a mixture of primary colors having imbalanced emission energy contents, and the compensating light further having a compensating emission energy content for a spectral range to offset the emission energy imbalance of the primary light source.

7. The system of claim 6, in which:
   the imbalanced emission energy content corresponds to red light emitted by the arc lamp; and
   the spectral range encompasses red light of an intensity that causes a reduction in the emission energy imbalance.

8. An image projection system comprising:
   a primary light source, including a light reflector having an inner surface, to propagate a polychromatic light along a primary light path;
   an auxiliary light source, proximally disposed adjacent to the primary light source to propagate a compensating light to compensate the polychromatic light for at least brightness during an initial period, the compensating light reflecting off the light reflector of the primary light source and coinciding with the polychromatic light at a location on the primary light path;
   an optical integrating device, disposed along the primary light path, to receive the polychromatic light combined with the compensating light, and to improve uniformity of intensity of the combined light prior to exiting the optical integrating device; and
   an imaging arrangement optically coupled to the optical integrating device to project an image using the exiting light with more balanced emission energy contents.

9. The system of claim 8, in which the primary light source comprises an arc lamp, the polychromatic light having an emission spectrum composed of a mixture of primary colors having imbalanced emission energy contents, and the compensating light further having a compensating emission energy content for a spectral range to offset the emission energy imbalance of the primary light source.

10. The system of claim 9, in which:
    the imbalanced emission energy content corresponds to red light emitted by the arc lamp; and
    the spectral range encompasses red light of an intensity that causes a reduction in the emission energy imbalance.

11. The system of claim 9, in which at least a portion of an inner surface of the reflector is covered by a color selective transmission coating that transmits the emission energy content of the compensating light and reflects the emission energy content of light that differs from the emission energy content of the compensating light.

12. An image projection system comprising:
    a primary light source to propagate a polychromatic light along a primary light path;
    an auxiliary light source to propagate a compensating light to compensate the polychromatic light for at least brightness during an initial period;
    an optical integrating device, disposed along the primary light path and having at least a first and a second flyseye integrator plate each containing an array of lenslets, the optical integrating device being optically coupled to the primary and auxiliary light sources in a manner to separately receive and combine the polychromatic and compensating lights; and
    an imaging arrangement optically coupled to the optical integrating device to project an image using the exiting light with more balanced emission energy contents.

13. The system of claim 12, in which the auxiliary light source includes an optical fiber through which the compensating light propagates, the optical fiber being optically coupled to one of a first side surface, a second side surface, and an entrance end of the light tunnel at the location upstream of or substantially at the first reflection of light.

14. The system of claim 13, in which the optical fiber has an exit end, and further comprising a reflective surface positioned between the exit end of the optical fiber and the light tunnel, the reflective surface optically coupling the compensating light propagating through the optical fiber to the light tunnel in a direction and at an angle to coincide with the primary light path at the location of the light tunnel upstream of or substantially at the location of the first reflection of light.

15. The system of claim 14, in which the optical fiber has an exit end, and further comprising one of a molded optical material or element positioned between the exit end of the optical fiber and the light tunnel, the one of a molded optical material or element optically coupling the compensating light propagating through the optical fiber to the light tunnel in a direction and at an angle to coincide with the primary light path at the location of the light tunnel upstream of or substantially at the location of the first reflection of light.

16. The system of claim 12, in which the primary light source comprises an arc lamp, the polychromatic light having an emission spectrum composed of a mixture of primary colors having imbalanced emission energy contents, and the compensating light further having a compensating emission energy content for a spectral range to offset the emission energy imbalance of the primary light source.

17. The system of claim 16, in which:
the imbalanced emission energy content corresponds to red light emitted by the arc lamp; and
the spectral range encompasses red light of an intensity that causes a reduction in the emission energy imbalance.

18. In an image projection system, a method of operation comprising: propagating from a primary light source and along a primary light path, polychromatic light;
propagating from an auxiliary light source, a compensating light to compensate the polychromatic light for at least white light during an initial period, directing the compensating light to coincide with the polychromatic light to combine the lights employing a selected one of an optical integrating device with a light tunnel within which light propagating through the light tunnel undergoes multiple occurrences of reflection so that light exiting the light tunnel is of substantially uniform light intensity, with the lights being directed to be received by the optical integrating device separately, but coinciding at a location upstream of or substantially at the location of the first reflection of light;
a primary light source having a reflector to reflect the compensating light to coincide with the polychromatic light, with the auxiliary light source being proximally disposed adjacent to the primary light source, and
an optical integrating device having a first and a second flyseys integrator plate each containing an array of lenslets; and
projecting an image using the integrated combined light.

19. The method of claim 18, in which said integrating being performed using an optical integrating device having a light tunnel, and the method further comprises employment of an optical fiber to assist in directing the compensating light to the coincidence location.

20. The method of claim 18, in which said integrating being performed using an optical integrating device having a first and a second flyseye integrator plate, and the method further comprises employment of an optical fiber to assist in directing the compensating light to the flyseye integrator plates.

21. The method of claim 18, in which the primary light source comprises an arc lamp, the polychromatic light having an emission spectrum composed of a mixture of primary colors having imbalanced emission energy contents, and the compensating light further having a compensating emission energy content for a spectral range to offset the emission energy imbalance of the primary light source.

22. The method of claim 21, in which:
the imbalanced emission energy content corresponds to red light emitted by the arc lamp; and
the spectral range encompasses red light of an intensity that causes a reduction in the emission energy imbalance.

* * * * *